US008326725B2

(12) United States Patent
Elwell et al.

(10) Patent No.: US 8,326,725 B2
(45) Date of Patent: Dec. 4, 2012

(54) METHOD AND SYSTEM FOR OBTAINING USER DATA FROM THIRD PARTIES

(75) Inventors: Joseph Elwell, San Diego, CA (US);
Alan Buhler, San Diego, CA (US);
Marianne Y. Lu, Encinitas, CA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 12/983,720

(22) Filed: Jan. 3, 2011

(65) Prior Publication Data
US 2012/0173397 A1 Jul. 5, 2012

(51) Int. Cl.
*G06Q 40/00* (2012.01)
(52) U.S. Cl. ........................................ 705/36 R; 705/35
(58) Field of Classification Search .................... 705/35, 705/36 R, 36 T, 44
See application file for complete search history.

(56) References Cited

U.S. PATENT DOCUMENTS

| | | | | |
|---|---|---|---|---|
| 2004/0230536 | A1* | 11/2004 | Fung et al. | 705/64 |
| 2006/0253327 | A1* | 11/2006 | Morris et al. | 705/14 |
| 2006/0253328 | A1* | 11/2006 | Kohli et al. | 705/14 |
| 2007/0011089 | A1* | 1/2007 | DeSchryver | 705/39 |
| 2009/0106144 | A1* | 4/2009 | Del Favero et al. | 705/39 |
| 2010/0332328 | A1* | 12/2010 | Dharmaji et al. | 705/14.64 |
| 2011/0197285 | A1* | 8/2011 | Ginter et al. | 726/27 |
| 2011/0258092 | A1* | 10/2011 | Edwards et al. | 705/30 |
| 2011/0264559 | A1* | 10/2011 | Barrientos et al. | 705/27.1 |
| 2011/0270748 | A1* | 11/2011 | Graham et al. | 705/40 |
| 2011/0270760 | A1* | 11/2011 | Graham et al. | 705/51 |
| 2011/0270761 | A1* | 11/2011 | Graham et al. | 705/51 |
| 2011/0270763 | A1* | 11/2011 | Graham et al. | 705/71 |

OTHER PUBLICATIONS

Marinova et al. "Permission e-mail marketing as a means of targeted promotion" Feb. 2002 Cornell Hotel & Restaurant Administration Quarterly v43n1 pp. 61-69.*
Giglio, Vincent "Privacy in the world of cyberbanking: Emerging legal issues and how you are protected" Mar./Apr. 2002 Secured Lender v58n2 pp. 48-60.*

* cited by examiner

*Primary Examiner* — Kelly Campen
(74) *Attorney, Agent, or Firm* — McKay and Hodgson, LLP; Philip McKay; Sean P. Lewis

(57) ABSTRACT

A user of a data management system agrees to allow the data management system to obtain user data associated with the user from a third party target site computing system. A distributed client is then implemented on one or more user computing systems used by the one or more users to access the target site computing system. The data management system then makes a request to the distributed client, and the user computing system, to obtain desired data from the target site computing system. The distributed client(s) then accesses/access, directs the user computing system(s) to access, or waits for the user(s) to next access, the target site computing system. The target site computing system is then securely accessed by the user computing system, thereby by-passing any selective blocking/failure filters, and the requested data is accessed and provided to the data management system provider computing system.

18 Claims, 3 Drawing Sheets

METHOD AND SYSTEM FOR OBTAINING USER DATA FROM THIRD PARTIES

BACKGROUND

As the Internet has come to be a leading source of information and a major avenue for commerce, more and more consumers/users have come to rely on various third parties to store their data and then provide the user access to that data whenever the user desires, typically via the Internet, and/or one or more web-sites. As a specific example, many users rely on financial institutions, such as banks and credit card providers, to maintain data representing financial transactions conducted by the user and to provide the user access to that data.

In addition, many users have adopted data management systems that, in some cases, have the ability to obtain data from the various third parties, and third party web-sites, where the user's data is maintained. As a specific example, there are currently available various financial management systems including, but not limited to, computing system implemented, or web-based, systems, packages, programs, modules, or applications that gather financial data, including financial transactional data from these third parties, and that have the capability to analyze and categorize at least part of the financial data into various reports or displays that are provided to the user.

Types of financial management systems currently available include, but are not limited to, any of the following: on-line, or web-based, or computing system implemented, personal or business financial management systems, packages, programs, modules, or applications; on-line, or web-based, or computing system implemented, home or business inventory systems, packages, programs, modules, or applications; on-line, or web-based, or computing system implemented, personal or business asset management systems, packages, programs, modules, or applications; on-line, or web-based, or computing system implemented, personal or business accounting systems, packages, programs, modules, or applications; or any other on-line, or web-based, or computing system implemented, financial management systems discussed herein or as known in the art at the time of filing.

Specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; Mint.com™, available from Intuit Inc. of Mountain View, Calif.; Microsoft Money™, available from Microsoft, Inc. of Redmond, Wash.; or various other computing system implemented financial management systems discussed herein, or known to those of skill in the art at the time of filing, or as developed after the time of filing.

As noted above, currently available financial management systems help individuals/users manage their finances by providing a centralized interface with banks, credit card companies, asset account providers, mortgage companies, retirement account providers, and other various financial and asset management institutions or accounts, for identifying, processing, storing, and categorizing largely historical data associated with completed user financial transactions. To this end, financial management systems typically try to obtain financial transaction information, such as payee identification, payee location, payment amount, date of the transaction, time of transaction, the type of transaction, etc., via communication with banks, credit card providers, or other financial institutions, often by using electronic data transfer systems such as the Open Financial Exchange (OFX) specification or various other systems for transferring financial transaction data.

Some sources of user data, i.e., some third parties that maintain data on behalf of users, do not have OFX capability. In addition, in some cases, third parties that maintain data on behalf of users do not want to allow "outside" data management systems access to the user's data, despite the fact the user desires the data management systems to have access to the user's data, and the data management systems have explicit access permission. Often, this situation arises when the third parties that maintain data on behalf of users desire to force the user to use a competing data management product offered by, and/or sponsored by, and/or otherwise associated with the third party.

Despite third parties trying to prevent a user from allowing a data management system access to their own data, in some cases, a data management system, such as a financial management system, can still obtain the user's data, particularly when the third party allows users to access to their data using a web interface/website. In these cases, in order to obtain access to their own data, the users provide the data management system their log-on credentials, such as user name and password, and then the data management system accesses the third party, or "target", web-site using a data management system provider computing system, such as a data management system provider server system. The data management system provider computing system then "pretends" to be the user by using the provided log-in credentials to access the user's data. In some cases the data is accessed "directly" and in other cases the data is obtained via "screen scraping" or a similar technology.

However, as data management has become a more important service, and therefore a more profitable business, more and more third parties that maintain data on behalf of users have begun to take further measures to prevent data management systems from accessing a user's data on behalf of the user. These further measures include implementing specific blocking mechanisms or access filters that identify data management system provider computing systems, often using IP addresses, and then block any access to the third party web-sites/user data based on this identification. Typically, this occurs despite permissions and log-on credentials that the data management systems may have obtained from the users, and despite the users' desire that the data management systems obtain their data.

FIG. 1 is a block diagram illustrating one example of current hardware architecture for accessing user data 154 and current access blocking measures taken by some third parties that maintain data on behalf of users. As seen in FIG. 1, current hardware architecture for accessing user data 154 includes: a user computing system 100, e.g., a "user" or "first" computing system; a target site computing system 150, e.g., a "third party web-site" or "second" computing system; and a provider computing system 120, e.g., a "data management system provider" or "third" computing system, all operatively coupled by a network 130.

As seen in FIG. 1, user computing system 100 typically includes a central processing unit (CPU) 101 and a memory system 103. In one embodiment, memory system 103 includes all, or part of, a computing system implemented data management system 180 such as, but not limited to: a computing system implemented financial management system; a computing system implemented personal financial management system; a computing system implemented business financial management system; a computing system implemented personal accounting system; a computing system implemented business accounting system; a computing system implemented tax preparation system; a computing system implemented healthcare management system; or any other computing system implemented personal and/or business data management system, as discussed herein, and/or as known in the art at the time of filing, and/or as developed after the time of filing. In one embodiment, data management system 180 is stored, in whole, or in part, in memory system 103.

User computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user computing system 100, whether available or known at the time of filing or as later developed.

User computing system 100 can also include an Internet browser (not shown) that is stored, in whole, or in part in memory 103.

User computing system 100 can be any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices.

In addition, it should be noted that user computing system 100 can be representative of two more, i.e., multiple, user computing systems and that a single user computing system 100 is shown in FIG. 1 as illustrative of one or more user computing systems, such as user computing system 100.

Target site computing system 150 typically includes: a CPU 151; a memory system 153 that includes user data 154; an input/output (I/O) interface to user data 155; and selective block/failure filter 157.

Target site computing system 150 can be representative of any server, web-based, desktop, or other computing system. In addition, it should be noted that target site computing system 150 can be representative of two more, i.e., multiple, target site computing systems and that a single target site computing system 150 is shown in FIG. 1 as illustrative of one or more target site computing systems, such as target site computing system 150.

In addition target site computing system 150 can be representative of any database, data storage device, designated server system or computing system, a designated portion of one or more server systems or computing systems, a distributed database, a dedicated mass storage device implemented in software, hardware, or a combination of hardware and software, and/or any web-site or web-based function.

As discussed above, target site computing system 150 is representative of various third party data storage and presentation systems that store various data, such as user data 154, associated with one or more users and then provide the users access to that data, typically via the Internet and one or more web-sites. As a specific example, target site computing system 150 may be maintained by financial institutions, such as banks and credit card providers, to maintain data, such as user data 154, representing financial transactions conducted by the user and to provide the user access to that data.

Target site computing system 150 can be any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for obtaining user data from a third party, and/or a computing system implemented financial management system, in accordance with at least one of the embodiments as described herein.

As also shown in FIG. 1, provider computing system 120 includes memory 123, with at least part of an online data management system 190 therein; and CPU 121. As noted above, one specific illustrative example of an online data management system 190 is any on-line financial management system such as, but not limited to: an on-line personal financial management system; an on-line business financial management system; an on-line personal accounting system; an on-line business accounting system; an on-line tax preparation system; an on-line healthcare management system; or any other an on-line personal and/or business data management system, as discussed herein, and/or as known in the art at the time of filing, and/or as developed after the time of filing.

Provider computing system 120 is any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for obtaining user data from a third party, and/or a computing system implemented financial management system, in accordance with at least one of the embodiments as described herein.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Typically, using current systems, user data 154 is accessible to a user, and/or user computing system 100, via network connection 171A and 171B through network 130 to I/O interface to user data 155. As discussed above, it is now often the case that the user, and user computing system 100, is identified by selective block/failure filter 157, often by an IP address associated with user computing system 100, before access to user data 154 is allowed.

In addition, using some current systems, provider computing system 120 obtains permission and/or log-on credentials for target site computing system 150 and user data 154 from the user. Then provider computing system 120 attempts to access user data 154 using the provided permission and/or log-on credentials for target site computing system 150 via network connection 181A and 181B through network 130 to I/O interface to user data 155. However, in some cases, provider computing system 120 is identified by selective block/failure filter 157, often by an IP address associated with provider computing system 120, and, before access to user data 154 is allowed, provider computing system 120 is blocked, i.e., denied access by selective block/failure filter 157.

Consequently, currently, the user must often manually login to target site computing systems, manually collect the data they need and type it into the data management system line by line.

As discussed above, using current data access systems, data management systems, and data management system provider computing systems, are often denied access to third party web-sites and user data despite the fact that the users have implicitly and/or explicitly indicated a desire to provide the data management systems access to what, after all, is their data. As also noted above, this typically occurs because the third parties that maintain data on behalf of users desire to force the user to use a competing data management product offered by, and/or sponsored by, and/or otherwise associated with, the third party. Consequently, using current data accessing systems, users are often held hostage by their own data. This situation not only arguably represents a misuse of power, and a user's data, it also has a chilling effect on the development and marketing of potentially more efficient and useful data management systems.

SUMMARY

In accordance with one embodiment, a method and system for obtaining user data from a third party includes a process for obtaining user data from a third party whereby, in one embodiment, a user of a data management system agrees to allow the data management system to obtain user data associated with the user from a third party target site computing system. In one embodiment, the user provides the data management system various log-on credentials necessary to log-on to one or more target site computing systems where data associated with the user, or other users, is stored. In one embodiment, a distributed client is then implemented on, or otherwise associated with, one or more user computing systems used by the one or more users to access the target site computing system. In one embodiment, the data management system, and/or a data management system provider computing system, makes a request to the distributed client, and the user computing system, to obtain desired data from the target site computing system. The distributed client(s) then accesses/access, directs the user computing system(s) to access, or waits for the user(s) to next access, the target site computing system. In one embodiment, the target site computing system is then securely accessed by the user computing system, thereby by-passing any selective blocking/failure filters, and the requested data is accessed. In one embodiment, the user computing system, and/or distributed client, then obtains the requested data from the target site computing system either "directly" or via "screen scraping" or a similar technology. In one embodiment, the data management system, and/or data management system provider computing system, is then provided access to the requested data from the target site computing system.

Using the method and system for obtaining user data from a third party, as discussed herein, a distributed client is deployed so that a user computing system accesses data on a target site computing system on behalf of the data management system, and/or data management system provider computing system. Consequently, using the method and system for obtaining user data from a third party, as discussed herein, the data management system, and/or data management system provider computing system, cannot be identified. Therefore, using the method and system for obtaining user data from a third party, as discussed herein, selective blocking/failure filters can be by-passed and the data management system, and/or data management system provider computing system, cannot be blocked without blocking the user's themselves.

In addition, using the method and system for obtaining user data from a third party, as discussed herein, when the distributed client is deployed on multiple user computing systems, each user computing system effectively becomes a data portal to the target site computing system. Consequently, using the method and system for obtaining user data from a third party, as discussed herein, specific access blockages that exist for any reason can be by-passed.

In addition, using the method and system for obtaining user data from a third party, as discussed herein, the user computing systems can perform portions of the downloading, storage and analysis of user data currently performed solely by the data management system provider computing system, thereby taking some of the processor and bandwidth burden off of the data management system provider computing system. Therefore, using the method and system for obtaining user data from a third party, as discussed herein, users can more freely and reliably access and use their own data and that data can be processed and/or used more efficiently.

As discussed in more detail below, using the below embodiments, with little or no modification and/or user input, there is considerable flexibility, adaptability, and opportunity for customization to meet the specific needs of various users under numerous circumstances.

Figure 1:
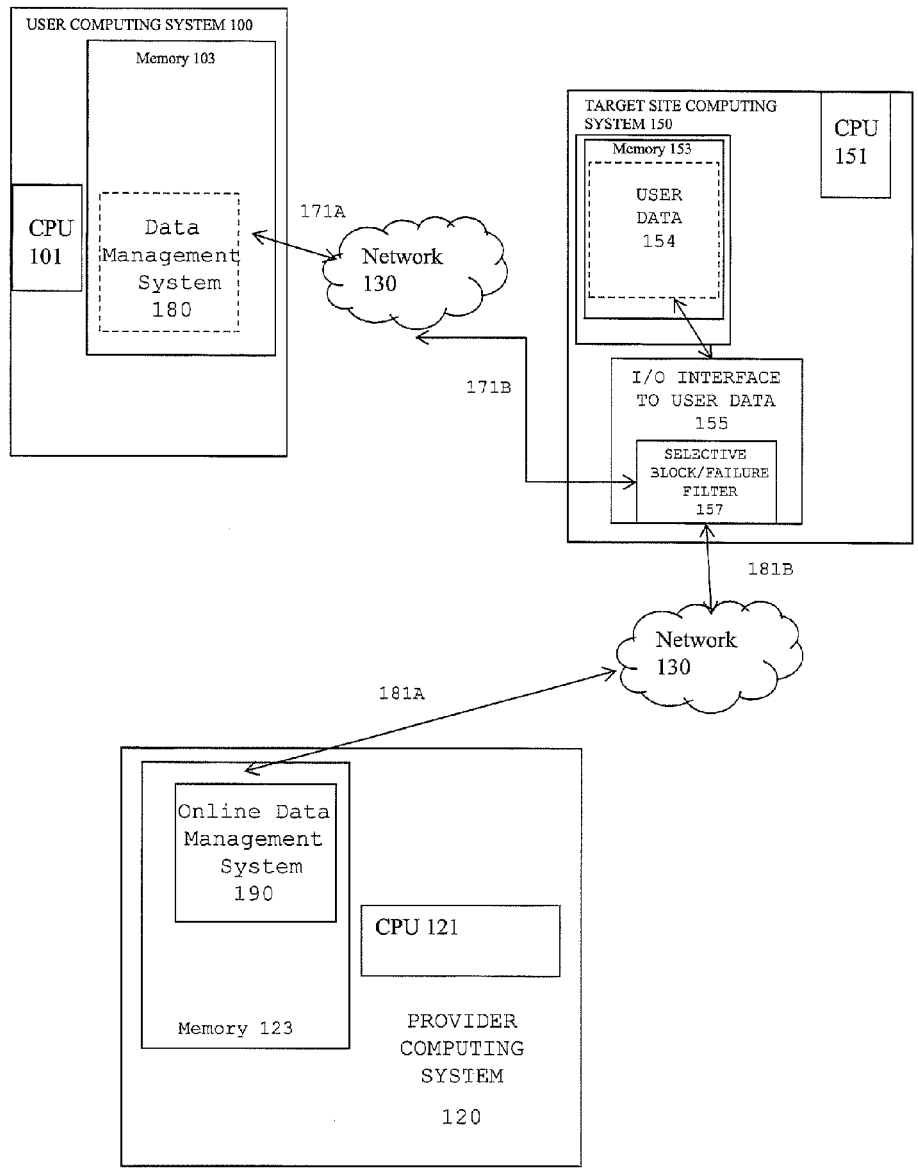
FIG. 1 is a block diagram of an exemplary current hardware architecture for accessing user data.

Common reference numerals are used throughout the FIGS and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a method and system for obtaining user data from a third party includes a process for obtaining user data from a third party whereby, in one embodiment, a user of a data management system agrees to allow the data management system to obtain user data associated with the user from a third party target site computing system.

As used herein, the term data management system includes, but is not limited to: any web-based, online, or computing system implemented, financial management system; any web-based, online, or computing system implemented, personal financial management system; any web-based, online, or computing system implemented, business financial management system; any web-based, online, or computing system implemented, personal accounting system; any web-based, online, or computing system implemented, business accounting system; any web-based, online, or computing system implemented, tax preparation system; any web-based, online, or computing system implemented, healthcare management system; or any other any web-based, online, or computing system implemented, personal and/or business data management system, as discussed herein, and/or as known in the art at the time of filing, and/or as developed after the time of filing.

As noted above, in one embodiment, the data management system is a financial management system.

In one embodiment, the financial management system is any one of various financial management systems including, but not limited to, any computing system implemented, on-line or web-based, system, package, program, module, or application.

In one embodiment, the financial management system desires to obtain the user's financial transaction data associated with financial transactions conducted using multiple payment methods to provide as complete a set of user financial data as possible. For instance, in various embodiments, the financial management system desires to obtain the user's financial transaction data from third party target site computing systems maintained by, but not limited to, any one or more of the following: banks; debit cards and/or accounts; credit unions; credit cards and/or accounts and/or credit card/account providers; asset accounts and/or asset account providers; or other financial resources, accounts and/or services used by a user to pay for and/or conduct financial transactions.

In addition, in some embodiments, the financial management system desires to obtain the user's financial transaction data from multiple third party target site computing systems of the same type. For instance, in various embodiments, the financial management system desires to obtain the user's financial transaction data from third party target site computing systems: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a user to pay for and/or conduct financial transactions.

Types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; or any of the numerous on-line, or web-based, or computing system implemented financial management systems as discussed herein, and/or as known in the art at the time of filing, and/or as developed after the time of filing.

Financial management systems typically help users/users manage their finances by providing a centralized interface with banks, credit card companies, and other various financial institutions and/or accounts, for identifying, processing, storing, and categorizing user financial transactions and other user financial data. Currently, financial management systems often obtain financial transaction information, such as payee identification, payee location, payment amount, date of the transaction, time of transaction, the type of transaction, etc., via communication with banks, credit card providers, or other financial institutions, using electronic data transfer systems such as the Open Financial Exchange (OFX) specification or various other systems for transferring financial transaction data.

Specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; Mint.com™, available from Intuit Inc. of Mountain View, Calif.; Microsoft Money™, available from Microsoft, Inc. of Redmond, Wash.; or various other computing system implemented financial management systems discussed herein, or known to those of skill in the art at the time of filing, or as developed after the time of filing.

As noted above, some third parties that maintain data on behalf of users, i.e., owners of target site computing systems, do not have OFX capability. In addition, in some cases, i.e., owners of target site computing systems, do not want to allow "outside" data management systems access to the user's data, despite the fact the user desires the data management systems to have access to the user's data, and the data management systems have explicit access permission. To this end, some third parties that maintain data on behalf of users, i.e., owners of target site computing systems, have begun implementing specific blocking mechanisms, i.e., selective blocking/failure filters, or access filters, that identify data management system provider computing systems, often using IP addresses, and then block any access to the third party web-sites/user data based on this identification.

In one embodiment, the user provides the data management system various log-on credentials necessary to log-on to one or more target site computing systems where data associated with the user, or other users, is stored. In one embodiment, the log-on credentials include, but are not limited to: user names and/or identification; passwords; user data such as social security numbers, or portion thereof; and/or any other data representing information necessary to log-on to one or more target site computing systems where data associated with the user, or other users, is stored.

In one embodiment, a distributed client is then implemented on, or otherwise associated with, one or more user computing systems used by the one or more users to access the target site computing system.

Herein, the term "computing system" includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, the distributed client is created in HTML 5 and/or java script.

In various embodiments, the distributed client is implemented via, or on, a web-browser associated with the user computing systems.

In various embodiments, the distributed client is software, or code, implemented, at least in part, on, or by, the user computing systems.

In various embodiments, the distributed client securely routes screen scraping, or other data collection, requests to third party target site computing system and gathers the data for the data management system, i.e., the data management system provider computing system. In various embodiments, the distributed client either simply routes the requests, or optionally can handle the processing of requests as well. In some embodiments, processing the requests entails navigating the third party target site computing system website and extracting the data.

As discussed below, in various embodiments, the secure channel is created by passing the target site computing systems certificate to the data management system provider computing system for verification. Once the secure channel is created, the data management system provider computing system passes data requests to the distributed client. This system therefore works in a similar manner to systems that prevent man in the middle attacks on services like Amazon.com, even though many computers pass the data between client and Amazon. However, currently, it is believed no party has combined security into distributed clients with screen scraping, or other data collection methods, to provide a workaround for accessing unfriendly/blocked third party target site computing systems and services.

Some illustrative example requests for a target site computing system maintained by "fictional slowbank":, in one embodiment, could include, but are not limited to: Load fictionalslowbank.com; enter customeruserid in formfield "loginForm.username"; enter customerpassword in formfield "loginForm.password"; click on formButton "loginForm.submit"; read balance from htmlContent; and "document.table1.div4.balanceRow.cell4".

As noted, in one embodiment, the data management system, and/or a data management system provider computing system, makes a request to the distributed client, and the user computing system, to obtain desired data from the target site computing system. The distributed client(s) then accesses/access, directs the user computing system(s) to access, or waits for the user(s) to next access, the target site computing system.

In one embodiment, the target site computing system is then securely accessed by the user computing system, thereby by-passing any selective blocking/failure filters, and the requested data is accessed.

In one embodiment, the user computing system, and/or distributed client, then obtains the requested data from the target site computing system either "directly" or via "screen scraping" or a similar technology. In one embodiment, the data management system, and/or data management system provider computing system, is then provided access to the requested data from the target site computing system.

As a specific illustrative example, let us assume a data management system user, i.e., a user, wants to add a new bank, "SlowBank" to the user's list of data sources, i.e., the user desires that the data management system gain access to data on a target site computing system maintained by "SlowBank".

Unfortunately, in this specific example, "SlowBank" does not offer OFX import. Consequently, the data management system obtains the user's log-on credentials and attempts to set up screen scraping to automatically browse the target site computing system maintained by "SlowBank" and pull the user's data off. However, "SlowBank" has some motive for blocking the data management system (maybe a partnership with a competitor), so they implement a selective block/failure filter to block the data management system's network from contacting the target site computing system, i.e., website, maintained by "SlowBank".

Using the process for obtaining user data from a third party discussed herein, a distributed client is associated with the user's computing system and the user's computing system is used to contact the target site computing system, i.e., website, maintained by "SlowBank" automatically. Then, in this example, screen scraping technology associated with the data management system is proxied through the user computing system.

In this specific illustrative example, requests for specific user data initiate on the data management system provider computing system and are communicated to the distributed client on the user computing system which routes them to target site computing system, i.e., website, maintained by "SlowBank".

As a result, in this specific example, the data management system obtains any, and/or all, of the user's data and can display it to the user. In this example, "SlowBank" can't block the proxied data request without also blocking their customers, i.e., the user, from connecting to their website at all, and, if they do that, they won't have customers for very long.

Using the process for obtaining user data from a third party discussed herein, the data management system provider computing system <-> target site computing system connection is by-passed. Consequently, using the process for obtaining user data from a third party discussed herein, the third party, and target site computing system, will have no way to tell the difference between direct user requests versus the data management system provider computing system proxied requests. Therefore, the process for obtaining user data from a third party discussed herein allows access to data that was previously inaccessible.

Using the process for obtaining user data from a third party discussed herein, some of the high network and hardware costs associated with data collection that is currently/normally borne by data management system provider computing systems is off-loaded to the user computing systems. In addition, using the process for obtaining user data from a third party discussed herein, data management system provider computing systems do not need to obtain/view entire target site computing systems websites each run, but can instead receive only the necessary data from the distributed clients associated with the user computing systems.

In addition, the process for obtaining user data from a third party discussed herein also differs from other offloaded distributed clients by offloading not only CPU, but bandwidth. Each request for a full webpage to the target site computing systems contains countless amounts of unnecessary data—data that is used to beautify the page to the customer's/user's eyes. Using the process for obtaining user data from a third party discussed herein, all of this extraneous data can be removed from the data management system provider computing systems network usage and processing by offloading the requests to the user computing systems.

Absent the process for obtaining user data from a third party discussed herein, i.e., currently, the user must manually login to target site computing systems, manually collect the data they need and type it into the data management system line by line. Using the process for obtaining user data from a third party discussed herein, that process is automated, thereby providing greater ease of use and accuracy.

Hardware System Architecture

Figure 2:
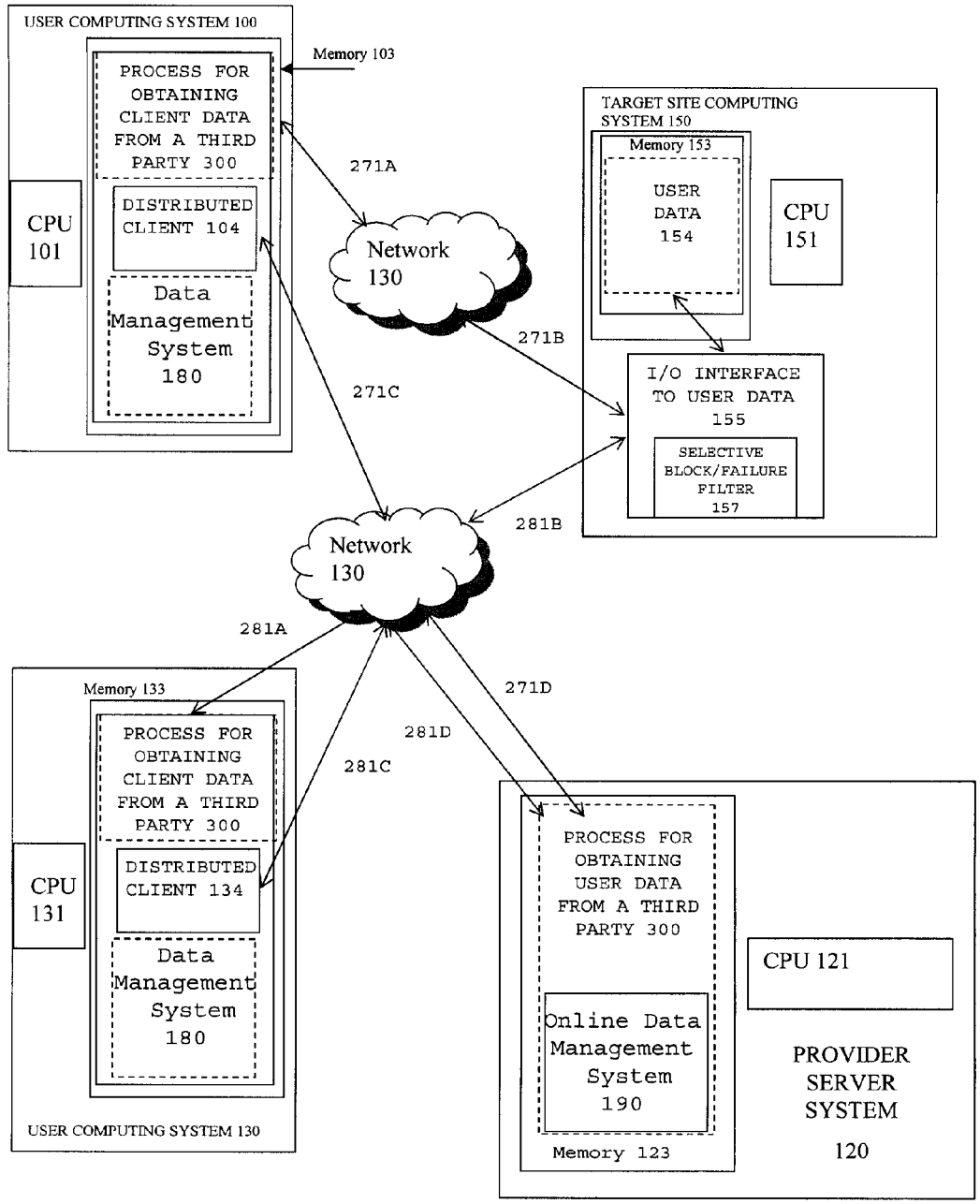
FIG. 2 is a block diagram of an exemplary hardware architecture for implementing one embodiment.

FIG. 2 is similar to FIG. 1 but includes a block diagram of an exemplary hardware architecture for implementing one embodiment of a system and method for obtaining user data from a third party, such as exemplary process 300, discussed herein. FIG. 2 includes: a user computing system 100, e.g., a first computing system; a user computing system 130, e.g., a fourth computing system; a target site computing system 150, e.g., a second computing system; and a provider computing system 120, e.g., a third computing system; all operatively coupled by a network 130.

As seen in FIG. 2, user computing system 100 typically includes a central processing unit (CPU) 101 and a memory system 103. In one embodiment, memory system 103 includes all, or part of, a computing system implemented data management system 180 such as, but not limited to: a computing system implemented financial management system; a computing system implemented personal financial management system; a computing system implemented business financial management system; a computing system implemented personal accounting system; a computing system implemented business accounting system; a computing system implemented tax preparation system; a computing system implemented healthcare management system; or any other computing system implemented personal and/or business data management system, as discussed herein, and/or as known in the art at the time of filing, and/or as developed after the time of filing. In one embodiment, data management system 180 is stored, in whole, or in part, in memory system 103.

In one embodiment, memory system 103 also includes all, or part of, process for obtaining user data from a third party 300 and/or a distributed client 104. Process for obtaining user data from a third party 300 and distributed client 104 are discussed in more detail below.

User computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user computing system 100, whether available or known at the time of filing or as later developed.

User computing system 100 can also include an Internet browser (not shown) that is stored, in whole, or in part in memory 103 and may include all, or part of, distributed client 104.

User computing system 100 can be any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices.

In addition, it should be noted that user computing system 100 can be representative of two more, i.e., multiple, user computing systems and that a single user computing system 100 is shown in FIG. 2 as illustrative of one or more user computing systems, such as user computing system 100.

Similarly, as seen in FIG. 2, user computing system 130 typically includes a central processing unit (CPU) 131 and a memory system 133. In one embodiment, memory system 133 includes all, or part of, a computing system implemented data management system 180. In one embodiment, data management system 180 is stored, in whole, or in part, in memory system 133.

In one embodiment, memory system 133 also includes all, or part of, process for obtaining user data from a third party 300 and/or a distributed client 134. Process for obtaining user data from a third party 300 and distributed client 134 are discussed in more detail below.

User computing system 130 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user computing system 130, whether available or known at the time of filing or as later developed.

User computing system 130 can also include an Internet browser (not shown) that is stored, in whole, or in part in memory 133 and may include all, or part of, distributed client 134.

User computing system 130 can be any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices.

In addition, it should be noted that user computing system 130 can be representative of two more, i.e., multiple, user computing systems and that a single user computing system 130 is shown in FIG. 2 as illustrative of one or more user computing systems, such as user computing system 130.

Target site computing system 150 typically includes: a CPU 151; a memory system 153 that includes user data 154; an input/output (I/O) interface to user data 155; and selective block/failure filter 157.

Target site computing system 150 can be representative of any server, web-based, desktop, or other computing system. In addition, it should be noted that target site computing system 150 can be representative of two more, i.e., multiple, target site computing systems and that a single target site computing system 150 is shown in FIG. 2 as illustrative of one or more target site computing systems, such as target site computing system 150.

In addition target site computing system 150 can be representative of any database, data storage device, designated server system or computing system, a designated portion of one or more server systems or computing systems, a distributed database, a dedicated mass storage device implemented in software, hardware, or a combination of hardware and software, and/or any web-site or web-based function.

As discussed above, target site computing system 150 is representative of various third party data storage and presentation systems that store various data, such as user data 154, associated with one or more users and then provide the users access to that data, typically via the Internet and one or more web-sites. As a specific example, target site computing system 150 may be maintained by financial institutions, such as banks and credit card providers, to maintain data, such as user data 154, representing financial transactions conducted by the user and to provide the user access to that data.

Target site computing system 150 can be any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for obtaining user data from a third party, and/or a computing system implemented financial management system, in accordance with at least one of the embodiments as described herein.

As also shown in FIG. 2, provider computing system 120 includes memory 123, with at least part of an online data management system 190 and process for obtaining user data from a third party 300 therein; and CPU 121. As noted above, one specific illustrative example of an online data management system 190 is any on-line financial management system such as, but not limited to: an on-line personal financial management system; an on-line business financial management system; an on-line personal accounting system; an on-line business accounting system; an on-line tax preparation system; an on-line healthcare management system; or any other an on-line personal and/or business data management system, as discussed herein, and/or as known in the art at the time of filing, and/or as developed after the time of filing.

Provider computing system 120 is any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for obtaining user data from a third party, and/or a computing system implemented financial management system, in accordance with at least one of the embodiments as described herein.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Using process for obtaining user data from a third party 300 user data 154 is accessible to a user, and/or user computing system 100, via network connection 271A and 271B through network 130 to I/O interface to user data 155. As discussed above, it is now often the case that the user, and user computing system 100, is identified by selective block/failure filter 157, often by an IP address associated with user computing system 100, before access to user data 154 is allowed.

Using process for obtaining user data from a third party 300 user data 154 is accessible to a user, and/or user computing system 130, via network connection 281A and 281B through network 130 to I/O interface to user data 155. As discussed above, it is now often the case that the user, and user computing system 130, is identified by selective block/failure filter 157, often by an IP address associated with user computing system 130, before access to user data 154 is allowed.

As noted above, and referring to FIG. 1, using some current systems, provider computing system 120 obtains permission and/or log-on credentials for target site computing system 150 and user data 154 from the users. Then provider computing system 120 attempts to access user data 154 using the provided permission and/or log-on credentials for target site computing system 150 via network connection 181A and 181B through network 130 to I/O interface to user data 155 (FIG. 1). However, in some cases, provider computing system 120 is identified by selective block/failure filter 157, often by an IP address associated with provider computing system 120, and, before access to user data 154 is allowed, provider computing system 120 is blocked, i.e., denied access by selective block/failure filter 157.

In contrast, referring back to FIG. 2, using process for obtaining user data from a third party 300 provider computing system 120 accesses user data 154 by connecting to distributed client 104 on user computing system 100 via connection 271C and 271D through network 130 and then distributed client 104 securely routes screen scraping, or other data collection, requests to target site computing system 150 and gathers the data for data management systems 180 and/or 190, i.e., provider computing system 120.

As noted above, using process for obtaining user data from a third party 300, in various embodiments, distributed client 104 either simply routes the requests, or optionally can handle the processing of requests as well. In some embodiment, processing the requests entails navigating the site computing system 150 website and extracting the data.

As discussed below, in various embodiments, the secure channel is created by passing the target site computing system 150 certificate to provider computing system 120 for verification. Once the secure channel is created, provider computing system 120 passes data requests to distributed client 104. This system would therefore work in a similar manner to systems that prevent man in the middle attacks on services like Amazon.com, even though many computers pass the data between client and Amazon. However, currently, it is believed no party has combined security into distributed clients with screen scraping, or other data collection methods, to provide a workaround for accessing unfriendly/blocked third party target site computing systems and services.

Similarly, using process for obtaining user data from a third party 300 provider computing system 120 accesses user data 154 by connecting to distributed client 134 on user computing system 130 via connection 281C and 281D through network 130 and then distributed client 134 securely routes screen scraping, or other data collection, requests to target site computing system 150 and gathers the data for data management systems 180 and/or 190, i.e., provider computing system 120.

As noted above, using process for obtaining user data from a third party 300, in various embodiments, distributed client 134 either simply routes the requests, or optionally can handle the processing of requests as well. In some embodiment, processing the requests entails navigating the site computing system 150 website and extracting the data.

As discussed below, in various embodiments, the secure channel is created by passing the target site computing system 150 certificate to provider computing system 120 for verification. Once the secure channel is created, provider computing system 120 passes data requests to distributed client 134.

Using process for obtaining user data from a third party 300, distributed client 104/134 is deployed so that user computing system 100/130 accesses data on target site computing system 150 on behalf of the data management system, and/or provider computing system 120. Consequently, using process for obtaining user data from a third party 300, the data management system, and/or provider computing system 120, cannot be identified.

Therefore, using process for obtaining user data from a third party 300, selective blocking/failure filters 157 can be by-passed and the data management system, and/or provider computing system 120, cannot be blocked without blocking the user's themselves.

In addition, using process for obtaining user data from a third party 300, when distributed client 104/134 is deployed on multiple user computing systems 100/130, each user computing system 100/130 effectively becomes a portal to target site computing system 150. Consequently, using process for obtaining user data from a third party 300, specific access blockages that exist for any reason can be by-passed.

In addition, using process for obtaining user data from a third party 300, user computing systems 100/130 can perform portions of the downloading, storage and analysis of user data 154 currently performed solely by provider computing system 120, thereby taking some of the processor and bandwidth burden off of provider computing system 120. Therefore, using process for obtaining user data from a third party 300, users can more freely and reliably access and use their own user data 154 and that data can be processed and/or used more efficiently.

Process

Herein, the terms "user", "individual", "consumer", and/or "customer" are used interchangeably to denote any party that wishes to provide any data management system, or any other party, access to their data on a third party target site computing system using a process for obtaining user data from a third party, and/or a person who is the subject of, source of, and/or target of, all, or part of, any data/information made available by a process for obtaining user data from a third party, and/or a legal guardian of any party that wishes to provide any data management system, or any other party, access to their data on a third party target site computing system using a process for obtaining user data from a third party, and/or an authorized agent of any party that wishes to provide any data management system, or any other party, access to their data on a third party target site computing system using a process for obtaining user data from a third party, and/or any other authorized party associated with any party that wishes to provide any data management system, or any other party, access to their data on a third party target site computing system using a process for obtaining user data from a third party.

As used herein, the term data management system includes, but is not limited to: any web-based, online, or computing system implemented, financial management system; any web-based, online, or computing system implemented, personal financial management system; any web-based, online, or computing system implemented, business financial management system; any web-based, online, or computing system implemented, personal accounting system; any web-based, online, or computing system implemented, business accounting system; any web-based, online, or computing system implemented, tax preparation system; any web-based, online, or computing system implemented, healthcare management system; or any other any web-based, online, or computing system implemented, personal and/or business data management system, as discussed herein, and/or as known in the art at the time of filing, and/or as developed after the time of filing.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In accordance with one embodiment, a method and system for obtaining user data from a third party includes a process for obtaining user data from a third party whereby, in one embodiment, a user of a data management system agrees to allow the data management system to obtain user data associated with the user from a third party target site computing system. In one embodiment, the user provides the data management system various log-on credentials necessary to log-on to one or more target site computing systems where data associated with the user, or other users, is stored. In one embodiment, a distributed client is then implemented on, or otherwise associated with, one or more user computing systems used by the one or more users to access the target site computing system. In one embodiment, the data management system, and/or a data management system provider computing system, makes a request to the distributed client, and the user computing system, to obtain desired data from the target site computing system. The distributed client(s) then accesses/access, directs the user computing system(s) to access, or waits for the user(s) to next access, the target site computing system. In one embodiment, the target site computing system is then securely accessed by the user computing system, thereby by-passing any selective blocking/failure filters, and the requested data is accessed. In one embodiment, the user computing system, and/or distributed client, then obtains the requested data from the target site computing system either "directly" or via "screen scraping" or a similar technology. In one embodiment, the data management system, and/or data management system provider computing system, is then provided access to the requested data from the target site computing system.

Figure 3:
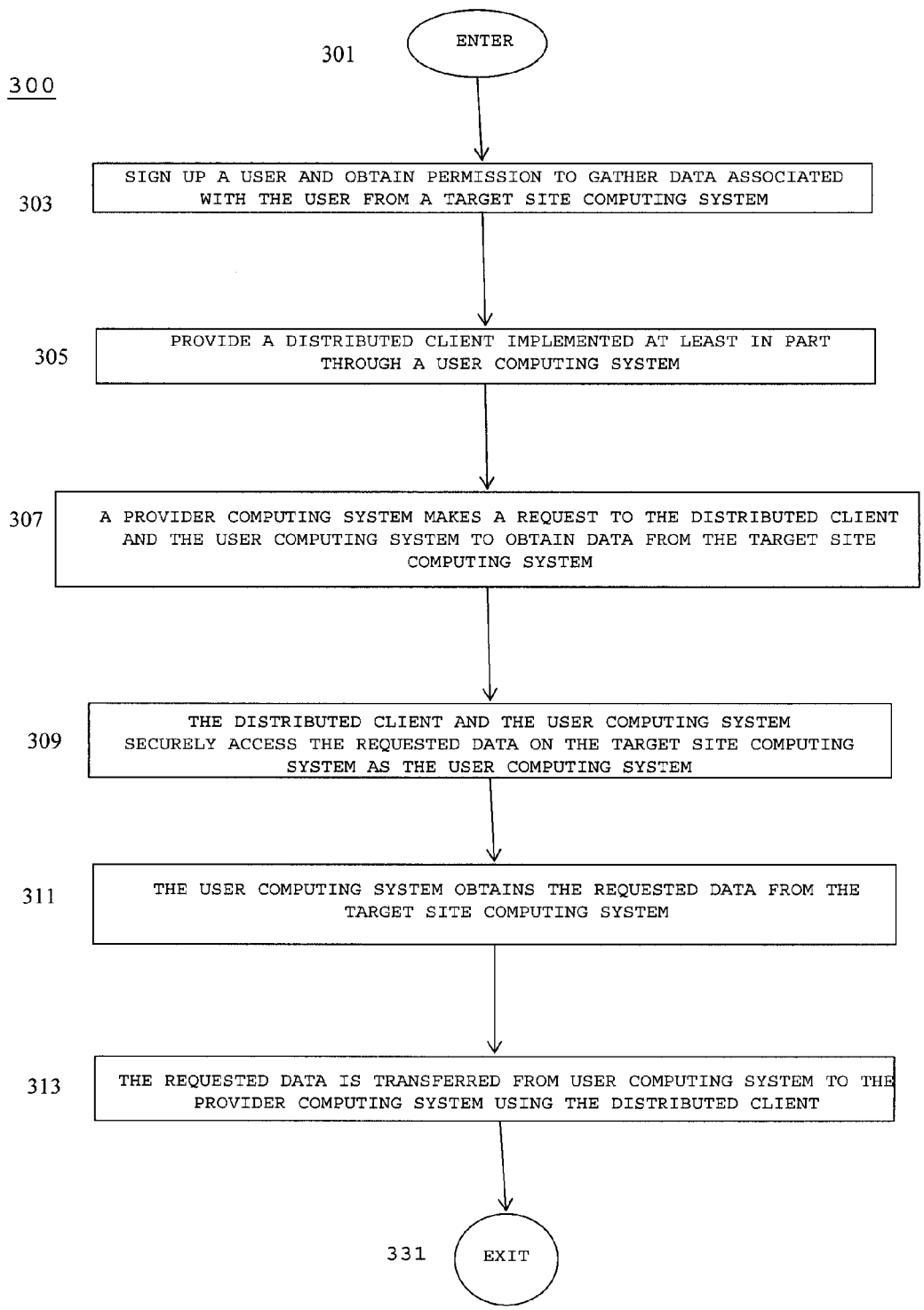
FIG. 3 is a flow chart depicting a process for obtaining user data from a third party in accordance with one embodiment.

FIG. 3 a flow chart depicting a process for obtaining user data from a third party 300 in accordance with one embodiment. Process for obtaining user data from a third party 300 begins at ENTER OPERATION 301 of FIG. 3 and process flow proceeds to SIGN UP A USER AND OBTAIN PERMISSION TO GATHER DATA ASSOCIATED WITH THE USER FROM A TARGET SITE COMPUTING SYSTEM OPERATION 303.

In one embodiment, at SIGN UP A USER AND OBTAIN PERMISSION TO GATHER DATA ASSOCIATED WITH THE USER FROM A TARGET SITE COMPUTING SYSTEM OPERATION 303 a user of a data management system agrees to allow the data management system to obtain user data associated with the user from a third party target site computing system.

In one embodiment, at SIGN UP A USER AND OBTAIN PERMISSION TO GATHER DATA ASSOCIATED WITH THE USER FROM A TARGET SITE COMPUTING SYSTEM OPERATION 303 a user of a data management system, such as data management systems 180 and/or 190 of FIG. 2, agrees to allow the data management system to obtain user data, such as user data 154 of FIG. 2, associated with the user from a third party target site computing system, such as target site computing system 150 of FIG. 2.

Returning to FIG. 3, as used herein, the term data management system includes, but is not limited to: any web-based, online, or computing system implemented, financial management system; any web-based, online, or computing system implemented, personal financial management system; any web-based, online, or computing system implemented, business financial management system; any web-based, online, or computing system implemented, personal accounting system; any web-based, online, or computing system implemented, business accounting system; any web-based, online, or computing system implemented, tax preparation system; any web-based, online, or computing system implemented, healthcare management system; or any other any web-based, online, or computing system implemented, personal and/or business data management system, as discussed herein, and/or as known in the art at the time of filing, and/or as developed after the time of filing.

As noted above, in one embodiment, the data management system is a financial management system.

In one embodiment, the financial management system is any one of various financial management systems including, but not limited to, any computing system implemented, on-line or web-based, system, package, program, module, or application.

In one embodiment, the financial management system desires to obtain the user's financial transaction data associated with financial transactions conducted using multiple payment methods to provide as complete a set of user financial data as possible. For instance, in various embodiments, the financial management system desires to obtain the user's financial transaction data from third party target site computing systems maintained by, but not limited to, any one or more of the following: banks; debit cards and/or accounts; credit unions; credit cards and/or accounts and/or credit card/account providers; asset accounts and/or asset account providers; or other financial resources, accounts and/or services used by a user to pay for and/or conduct financial transactions.

In addition, in some embodiments, the financial management system desires to obtain the user's financial transaction data from multiple third party target site computing systems of the same type. For instance, in various embodiments, the financial management system desires to obtain the user's financial transaction data from third party target site computing systems: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a user to pay for and/or conduct financial transactions.

Types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; or any of the numerous on-line, or web-based, or computing system implemented financial management systems as discussed herein, and/or as known in the art at the time of filing, and/or as developed after the time of filing.

Financial management systems typically help users/users manage their finances by providing a centralized interface with banks, credit card companies, and other various financial institutions and/or accounts, for identifying, processing, storing, and categorizing user financial transactions and other user financial data. Currently, financial management systems often obtain financial transaction information, such as payee identification, payee location, payment amount, date of the transaction, time of transaction, the type of transaction, etc., via communication with banks, credit card providers, or other financial institutions, using electronic data transfer systems such as the Open Financial Exchange (OFX) specification or various other systems for transferring financial transaction data.

Specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; Mint.com™, available from Intuit Inc. of Mountain View, Calif.; Microsoft Money™, available from Microsoft, Inc. of Redmond, Wash.; or various other computing system implemented financial management systems discussed herein, or known to those of skill in the art at the time of filing, or as developed after the time of filing.

As noted above, some third parties that maintain data on behalf of users, i.e., owners of target site computing systems, such as target site computing system 150 of FIG. 2, do not have OFX capability. In addition, in some cases, owners of target site computing systems, do not want to allow "outside" data management systems, such as data management systems 180 and/or 190 of FIG. 2, access to the user's data, such as user data 154 of FIG. 2, despite the fact the user desires the data management systems to have access to the user's data, and the data management systems have explicit access permission.

To this end, some third parties that maintain data on behalf of users, i.e., owners of target site computing systems such as target site computing system 150 of FIG. 2, have begun implementing specific blocking mechanisms, i.e., selective blocking/failure filters, or access filters, such as selective block/failure filter 157 of FIG. 2, that identify data management system provider computing systems, often using IP addresses, and then block any access to the third party websites/user data based on this identification.

Returning to FIG. 3, in one embodiment, the user provides the data management system various log-on credentials necessary to log-on to one or more target site computing systems where data associated with the user, or other users, is stored. In one embodiment, the log-on credentials include, but are not limited to: user names and/or identification; passwords; user data such as social security numbers, or portion thereof; and/or any other data representing information necessary to log-on to one or more target site computing systems where data associated with the user, or other users, is stored.

In one embodiment, once a user of a data management system agrees to allow the data management system to obtain user data associated with the user from a third party target site computing system at SIGN UP A USER AND OBTAIN PERMISSION TO GATHER DATA ASSOCIATED WITH THE USER FROM A TARGET SITE COMPUTING SYSTEM OPERATION 303, process flow proceeds to PROVIDE A DISTRIBUTED CLIENT IMPLEMENTED AT LEAST IN PART THROUGH A USER COMPUTING SYSTEM OPERATION 305.

In one embodiment, at PROVIDE A DISTRIBUTED CLIENT IMPLEMENTED AT LEAST IN PART THROUGH A USER COMPUTING SYSTEM OPERATION 305 a distributed client is implemented on, or otherwise associated with, one or more user computing systems used by the one or more users to access the target site computing system.

In one embodiment, at PROVIDE A DISTRIBUTED CLIENT IMPLEMENTED AT LEAST IN PART THROUGH A USER COMPUTING SYSTEM OPERATION 305 a distributed client, such as distributed client 104 and/or distributed client 134 of FIG. 2, is implemented on, or otherwise associated with, one or more user computing systems, such as user computing systems 100 and/or 130 of FIG. 2, used by the one or more users to access the target site computing system, such as target site computing system 150 of FIG. 2.

Returning to FIG. 3, herein, the term "computing system" includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, the distributed client of PROVIDE A DISTRIBUTED CLIENT IMPLEMENTED AT LEAST IN PART THROUGH A USER COMPUTING SYSTEM OPERATION 305 is created in HTML 5 and/or Java script.

In various embodiments, the distributed client of PROVIDE A DISTRIBUTED CLIENT IMPLEMENTED AT LEAST IN PART THROUGH A USER COMPUTING SYSTEM OPERATION 305 is implemented via, or on, a web-browser associated with the user computing systems.

In various embodiments, the distributed client of PROVIDE A DISTRIBUTED CLIENT IMPLEMENTED AT LEAST IN PART THROUGH A USER COMPUTING SYSTEM OPERATION 305 is software, or code, implemented, at least in part, on, or by, the user computing systems.

As discussed below, in various embodiments, the distributed client of PROVIDE A DISTRIBUTED CLIENT IMPLEMENTED AT LEAST IN PART THROUGH A USER COMPUTING SYSTEM OPERATION 305 securely routes screen scraping, or other data collection, requests to third party target site computing systems, such as target site computing system 150 of FIG. 2, and gathers the user data, such as user data 154 of FIG. 2, for the data management system, such as data managements systems 180 and/or 190 of FIG. 2, i.e., the data management system provider computing system, such as provider computing system 120 of FIG. 2.

Returning to FIG. 3, in various embodiments, the distributed client either simply routes the requests, or optionally can handle the processing of requests as well. In some embodiments, processing the requests entails navigating the third party target site computing system website and extracting the data.

In one embodiment, once a distributed client is implemented on, or otherwise associated with, one or more user computing systems used by the one or more users to access the target site computing system at PROVIDE A DISTRIBUTED CLIENT IMPLEMENTED AT LEAST IN PART THROUGH A USER COMPUTING SYSTEM OPERATION 305, process flow proceeds to A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307.

In one embodiment, at A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 the data management system, and/or a data management system provider computing system, makes a request to the distributed client of PROVIDE A DISTRIBUTED CLIENT IMPLEMENTED AT LEAST IN PART THROUGH A USER COMPUTING SYSTEM OPERATION 305, and/or the user computing system, to obtain desired data from the target site computing system.

In one embodiment, at A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 the data management system, such as data management systems 180 and/or 190 of FIG. 2, and/or a data management system provider computing system, such as provider computing system 120 of FIG. 2, makes a request to the distributed client, such as distributed clients 104 and/or 134, of PROVIDE A DISTRIBUTED CLIENT IMPLEMENTED AT LEAST IN PART THROUGH A USER COMPUTING SYSTEM OPERATION 305, and the user computing system, such as user computing systems 100 and/or 130 of FIG. 2, to obtain desired data, such as all. or part, of user data 154 of FIG. 2, from the target site computing system, such as target site computing system 150 of FIG. 2.

Returning to FIG. 3, as discussed above, in various embodiments, the distributed client of PROVIDE A DISTRIBUTED CLIENT IMPLEMENTED AT LEAST IN PART THROUGH A USER COMPUTING SYSTEM OPERATION 305 securely routes screen scraping, or other data collection, requests to third party target site computing system and gathers the data for the data management system, i.e., the data management system provider computing system. In various embodiments, the distributed client either simply routes the requests, or optionally can handle the processing of requests as well. In some embodiments, processing the requests entails navigating the third party target site computing system website and extracting the data.

In various embodiments, at A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 the secure channel is created by passing the target site computing system's certificate to the data management system provider computing system for verification. Once the secure channel is created, the data management system provider computing system passes data requests to the distributed client. This system therefore works in a similar manner to systems that prevent man in the middle attacks on services like Amazon.com, even though many computers pass the data between client and Amazon. However, currently, it is believed that, absent process for obtaining user data from a third party 300, no party or system has combined security into distributed clients with screen scraping, or other data collection methods, to provide a workaround for accessing unfriendly/blocked third party target site computing systems and services.

Some illustrative example requests for data of A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 involving a target site computing system, in this specific example, maintained by "fictional slowbank", could include, but are not limited to: Load fictionalslowbank.com; enter customeruserid in formfield "loginForm.username"; enter customerpassword in formfield "loginForm.password"; click on formButton "loginForm.submit"; read balance from htmlContent; and "document.table1.div4.balanceRow.cell4".

In one embodiment, once the data management system, and/or a data management system provider computing system, makes a request to the distributed client of PROVIDE A DISTRIBUTED CLIENT IMPLEMENTED AT LEAST IN PART THROUGH A USER COMPUTING SYSTEM OPERATION 305, and/or the user computing system, to obtain desired data from the target site computing system at A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307, process flow proceeds to THE DISTRIBUTED CLIENT AND THE USER COMPUTING SYSTEM SECURELY ACCESS THE REQUESTED DATA ON THE TARGET SITE COMPUTING SYSTEM AS THE USER COMPUTING SYSTEM OPERATION 309.

In one embodiment, at THE DISTRIBUTED CLIENT AND THE USER COMPUTING SYSTEM SECURELY ACCESS THE REQUESTED DATA ON THE TARGET SITE COMPUTING SYSTEM AS THE USER COMPUTING SYSTEM OPERATION 309 the distributed client(s) accesses/access, directs the user computing system(s) to access, or waits for the user(s) to next access, the target site computing system, thereby by-passing any selective blocking/failure filters, and the requested data of A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 is accessed.

In one embodiment, at THE DISTRIBUTED CLIENT AND THE USER COMPUTING SYSTEM SECURELY ACCESS THE REQUESTED DATA ON THE TARGET SITE COMPUTING SYSTEM AS THE USER COMPUTING SYSTEM OPERATION 309 the distributed client(s), such as distributed clients 104 and/or 134 of FIG. 2, accesses/access, directs the user computing system(s), such as user computing systems 100 and/or 130 of FIG. 2, to access, or waits for the user(s) to next access, the target site computing system, such as target site computing system 150 of FIG. 2, thereby by-passing any selective blocking/failure filters, such as selective block/failure filter 157 of FIG. 2, and the requested data, such as all, or part, of user data 154 of FIG. 2, of A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 is accessed.

Returning to FIG. 3, in one embodiment, once the distributed client(s) accesses/access, directs the user computing system(s) to access, or waits for the user(s) to next access, the target site computing system, thereby by-passing any selective blocking/failure filters, and the requested data of A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 is accessed at THE DISTRIBUTED CLIENT AND THE USER COMPUTING SYSTEM SECURELY ACCESS THE REQUESTED DATA ON THE TARGET SITE COMPUTING SYSTEM AS THE USER COMPUTING SYSTEM OPERATION 309, process flow proceeds to THE USER COMPUTING SYSTEM OBTAINS THE REQUESTED DATA FROM THE TARGET SITE COMPUTING SYSTEM OPERATION 311.

In one embodiment, at THE USER COMPUTING SYSTEM OBTAINS THE REQUESTED DATA FROM THE TARGET SITE COMPUTING SYSTEM OPERATION 311 the user computing system, and/or distributed client, obtains the requested data from the target site computing system either "directly" or via "screen scraping" or a similar technology.

In one embodiment, at THE USER COMPUTING SYSTEM OBTAINS THE REQUESTED DATA FROM THE TARGET SITE COMPUTING SYSTEM OPERATION 311 the user computing system, such as user computing systems 100 and/or 130, and/or distributed client, such as distributed clients 104 and/or 134 of FIG. 2, obtains the requested data, such as all, or part, of user data 154 of FIG. 2, from the target site computing system, such as target site computing system 150 of FIG. 2, either "directly" or via "screen scraping" or a similar technology.

Returning to FIG. 3, as noted, in one embodiment, the data management system, and/or a data management system provider computing system, makes a request to the distributed client, and the user computing system, at A PROVIDER COMPUTING SYSTEM MAKES A REQUEST TO THE DISTRIBUTED CLIENT AND THE USER COMPUTING SYSTEM TO OBTAIN DATA FROM THE TARGET SITE COMPUTING SYSTEM OPERATION 307 to obtain desired data from the target site computing system. In one embodiment, at THE DISTRIBUTED CLIENT AND THE USER COMPUTING SYSTEM SECURELY ACCESS THE REQUESTED DATA ON THE TARGET SITE COMPUTING SYSTEM AS THE USER COMPUTING SYSTEM OPERATION 309 the target site computing system is securely accessed by the user computing system, thereby by-passing any selective blocking/failure filters, and at THE USER COMPUTING SYSTEM OBTAINS THE REQUESTED DATA FROM THE TARGET SITE COMPUTING SYSTEM OPERATION 311 the user computing system, and/or distributed client, obtains the requested data from the target site computing system either "directly" or via "screen scraping" or a similar technology.

In one embodiment, once the user computing system, and/or distributed client, obtains the requested data from the target site computing system either "directly" or via "screen scraping" or a similar technology at THE USER COMPUTING SYSTEM OBTAINS THE REQUESTED DATA FROM THE TARGET SITE COMPUTING SYSTEM OPERATION 311, process flow proceeds to THE REQUESTED DATA IS TRANSFERRED FROM USER COMPUTING SYSTEM TO THE PROVIDER COMPUTING SYSTEM USING THE DISTRIBUTED CLIENT OPERATION 313.

In one embodiment, at THE REQUESTED DATA IS TRANSFERRED FROM USER COMPUTING SYSTEM TO THE PROVIDER COMPUTING SYSTEM USING THE DISTRIBUTED CLIENT OPERATION 313, the data management system, and/or data management system provider computing system, is provided access to the requested data from the target site computing system.

In one embodiment, at THE REQUESTED DATA IS TRANSFERRED FROM USER COMPUTING SYSTEM TO THE PROVIDER COMPUTING SYSTEM USING THE DISTRIBUTED CLIENT OPERATION 313, the data management system, such as data management systems 180 and/or 190 of FIG. 2, and/or data management system provider computing system, such as provider computing system 120 of FIG. 2 is provided access to the requested data, such as all, or part, of user data 154 of FIG. 2, from the target site computing system, such as target site computing system 150 of FIG. 2.

Returning to FIG. 3, in one embodiment, once the data management system, and/or data management system provider computing system, is provided access to the requested data from the target site computing system at THE REQUESTED DATA IS TRANSFERRED FROM USER COMPUTING SYSTEM TO THE PROVIDER COMPUTING SYSTEM USING THE DISTRIBUTED CLIENT OPERATION 313, process flow proceeds to EXIT OPERATION 331.

As a specific illustrative example of the operation of one embodiment of process for obtaining user data from a third party 300, let us assume a data management system user, i.e., a user, wants to add a new bank, "SlowBank" to the user's list of data sources, i.e., the user desires that the data management system gain access to data on a target site computing system maintained by "SlowBank".

Unfortunately, in this specific example, "SlowBank" does not offer OFX import. Consequently, the data management system obtains the user's log-on credentials and attempts to set up screen scraping to automatically browse the target site computing system maintained by "SlowBank" and pull the user's data off. However, "SlowBank" has some motive for blocking the data management system (maybe a partnership with a competitor), so they implement a selective block/failure filter to block the data management system's network from contacting the target site computing system, i.e., website, maintained by "SlowBank".

Using the process for obtaining user data from a third party discussed herein, a distributed client is associated with the user's computing system and the user's computing system is used to contact the target site computing system, i.e., website, maintained by "SlowBank" automatically. Then, in this example, screen scraping technology associated with the data management system is proxied through the user computing system.

In this specific illustrative example, requests for specific user data initiate on the data management system provider computing system and are communicated to the distributed client on the user computing system which routes them to target site computing system, i.e., website, maintained by "SlowBank".

As a result, in this specific example, the data management system obtains any, and/or all, of the user's data and can display it to the user. In this example, "SlowBank" can't block the proxied data request without also blocking their customers, i.e., the user, from connecting to their website at all, and, if they do that, they won't have customers for very long.

In one embodiment at EXIT OPERATION 331 process for obtaining user data from a third party 300 is exited to await new data.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using process for obtaining user data from a third party 300, a distributed client is deployed so that a user computing system accesses data on a target site computing system on behalf of the data management system, and/or data management system provider computing system. Consequently, using process for obtaining user data from a third party 300, the data management system, and/or data management system provider computing system, cannot be identified. Therefore, using process for obtaining user data from a third party 300, selective blocking/failure filters can be by-passed and the data management system, and/or data management system provider computing system, cannot be blocked without blocking the user's themselves.

In addition, using process for obtaining user data from a third party 300, when the distributed client is deployed on multiple user computing systems, each user computing system effectively becomes a portal to the target site computing system. Consequently, using process for obtaining user data from a third party 300, specific access blockages that exist for any reason can be by-passed.

In addition, using process for obtaining user data from a third party 300, the user computing systems can perform portions of the downloading, storage and analysis of user data currently performed solely by the data management system provider computing system, thereby taking some of the processor and bandwidth burden off of the data management system provider computing system. Therefore, using process for obtaining user data from a third party 300, users can more freely and reliably access and use their own data and that data can be processed and/or used more efficiently.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "monitoring", "matching", "updating", "associating", "analyzing", "defining", "storing", "saving", "displaying", "categorizing", "providing", "processing", "accessing", "selecting", "creating", "using", "submitting", "generating", "requesting" etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for obtaining data from a third party comprising the following of which a plurality are each executed via any set of one or more processors:

receiving, from an external requester, a request asking for permission from a party to obtain party data associated with the party, the data being located at an external target site;

receiving permission from the party to obtain from the external target site, party data associated with the party;

transmitting the received permission to the external requester, the external requester being at a site other than the target site;

receiving a distributed client from the external requester;

implementing the distributed client;

receiving a request from the external requester for party data associated with the party, the party data being at the target site;

responsive to the received request, securely accessing, by the external requester through the distributed client, the party data at the target site;

obtaining the requested party data from the target site through the distributed client; and providing the obtained party data to the requester.

2. The computing system implemented process for obtaining data from a third party of claim 1, wherein the target site is a financial institution.

3. The computing system implemented process for obtaining data from a third party of claim 2, wherein the financial institution is selected from at least one of the group of financial institutions consisting of:

one or more banks;

one or more debit cards and/or accounts;

one or more credit unions;

one or more credit cards and/or accounts;
one or more credit card/account providers;
one or more asset accounts; and
one or more asset account providers.

4. The computing system implemented process for obtaining data from a third party of claim 1, wherein
the distributed client is generated in HTML 5.

5. The computing system implemented process for obtaining data from a third party of claim 1, wherein
the distributed client is generated in Java script.

6. The computing system implemented process for obtaining data from a third party of claim 1, wherein
the distributed client is implemented via a web-browser.

7. A system for obtaining data from a third party comprising:
one or more processors; and
one or more memories coupled to the one or more processors, the one or more memories having instructions stored therein which when executed by any set of the one or more processors, execute a process comprising:
receiving, from an external requester, a request asking for permission from a party to obtain party data associated with the party, the data being located at an external target site;
receiving permission from the party to obtain from the external target site, party data associated with the party;
transmitting the received permission to the external requester, the external requester being at a site other than the target site;
receiving a distributed client from the external requester;
implementing the distributed client;
receiving a request from the external requester for party data associated with the party, the party data being at the target site;
responsive to the received request, securely accessing, by the external requester through the distributed client, the party data at the target site;
obtaining the requested party data from the target site through the distributed client; and
providing the obtained party data to the requester.

8. The system for obtaining data from a third party of claim 7, wherein
the target site is a financial institution.

9. The system for obtaining data from a third party of claim 8, wherein
the financial institution is selected from at least one of the group of financial institutions consisting of:
one or more banks;
one or more debit cards and/or accounts;
one or more credit unions;
one or more credit cards and/or accounts;
one or more credit card/account providers;
one or more asset accounts; and
one or more asset account providers.

10. The system for obtaining data from a third party of claim 7, wherein
the distributed client is generated in HTML 5.

11. The system for obtaining data from a third party of claim 7, wherein
the distributed client is generated in Java script.

12. The system for obtaining data from a third party of claim 7, wherein
the distributed client is implemented via a web-browser.

13. A computer program product for identifying charitable donations and automatically generating associated data comprising:
a nontransitory computer readable medium, the computer readable medium having stored thereon instructions which when executed by any set of one or more processors, perform a process comprising:
receiving, from an external requester, a request asking for permission from a party to obtain party data associated with the party, the data being located at an external target site;
receiving permission from the party to obtain from the external target site, party data associated with the party;
transmitting the received permission to the external requester, the external requester being at a site other than the target site;
receiving a distributed client from the external requester;
implementing the distributed client;
receiving a request from the external requester for party data associated with the party, the party data being at the target site;
responsive to the received request, securely accessing, by the external requester through the distributed client, the party data at the target site;
obtaining the requested party data from the target site through the distributed client; and
providing the obtained party data to the requester.

14. The system for obtaining data from a third party of claim 13, wherein
the target site is a financial institution.

15. The system for obtaining data from a third party of claim 14, wherein
the financial institution is selected from at least one of the group of financial institutions consisting of:
one or more banks;
one or more debit cards and/or accounts;
one or more credit unions;
one or more credit cards and/or accounts;
one or more credit card/account providers;
one or more asset accounts; and
one or more asset account providers.

16. The system for obtaining data from a third party of claim 13, wherein
the distributed client is generated in HTML 5.

17. The system for obtaining data from a third party of claim 13, wherein
the distributed client is generated in Java script.

18. The system for obtaining data from a third party of claim 13, wherein
the distributed client is implemented via a web-browser.

* * * * *